United States Patent
Johari et al.

[11] Patent Number: 5,911,146
[45] Date of Patent: Jun. 8, 1999

[54] APPARATUS AND METHOD FOR AUTOMATIC YELLOW PAGES PAGINATION AND LAYOUT

[75] Inventors: Ramesh Johari, Elk Grove, Ill.; Joseph Marks, Belmont, Mass.; Ali Partovi, Cambridge, Mass.; Stuart Merrill Shieber, Cambridge, Mass.

[73] Assignee: Mitsubishi Electric Information Technology Center America, Inc. (ITA), Cambridge, Mass.

[21] Appl. No.: 08/646,740

[22] Filed: May 3, 1996

[51] Int. Cl.$^6$ .................................................. G06T 15/00
[52] U.S. Cl. ................................................................ 707/525
[58] Field of Search .................................... 395/761, 779, 395/780, 787; 707/500, 518, 517, 525

[56] References Cited

U.S. PATENT DOCUMENTS

| | | | |
|---|---|---|---|
| 5,349,536 | 9/1994 | Ashtaputre et al. | 364/491 |
| 5,390,354 | 2/1995 | De Heus et al. | 395/787 |
| 5,416,889 | 5/1995 | Takahashi et al. | 395/22 |
| 5,434,961 | 7/1995 | Horiuchi et al. | 395/768 |
| 5,553,217 | 9/1996 | Hart et al. | 395/783 |

*Primary Examiner*—Mark R. Powell
*Attorney, Agent, or Firm*—Dirk Brinkman

[57] ABSTRACT

A computer-based system for automatic pagination and layout of yellow pages for a commercial telephone directory uses a simulated annealing heuristic to refine a randomly determined candidate solution. The text and advertisements which are to be included in the yellow pages directory are ordered in two distinct data streams representing the order of text and the order of advertisements in the directory. The system determines a possible layout, called a candidate solution, by randomly setting parameters defining the pagination and layout. These parameters may include page breaks in the advertisement stream, column numbers for each advertisement, and an amount of padding or empty space to be added to each page. Once the parameters are set, the individual pages are laid out by putting the advertisements in the next available position in their assigned columns, and the text around the advertisements. The solution is scored based upon the guidelines for the format and layout of the yellow pages directory. The solution is then optimized using a simulated annealing heuristic, which utilizes small modifications or perturbations randomly made to the initial parameters of the candidate solution. The revised solution is scored and compared to the score of the prior solution. The revised solution is then kept according to a probabilistic formula relating the two scores. Through an iterative process of perturbations, scoring, and comparing, the candidate solution becomes optimized. The process is repeated multiple times for different initial candidate solutions, each of which is randomly determined. A best solution is then selected from all of the optimized candidate solutions.

12 Claims, 3 Drawing Sheets

APPARATUS AND METHOD FOR AUTOMATIC YELLOW PAGES PAGINATION AND LAYOUT

This invention was supported by NSF Grant No. IRI-9350192, and the government has certain rights to the invention.

FIELD OF THE INVENTION

The present invention relates to a computer system for automatically paginating and laying out yellow page advertisements and text. More particularly, it relates to a system which uses a heuristic approach to optimize the pagination and positioning of text and advertisements.

BACKGROUND OF THE INVENTION

Yellow page telephone directories, so called because of the color of the paper on which they are printed, include advertisements and listings for commercial establishments organized by categories. The advertisements and listings are laid out according to certain rules and guidelines which relate to the pricing structure for entries in the yellow pages. Larger advertisements, which are more expensive, are placed before smaller advertisements within a category or section. Advertisements must be on the pages for the categories to which the advertisement belongs. The listings include the entities in alphabetical order and small "in-line" advertisements, which are in the appropriate alphabetical position. Typically, yellow pages are laid out in four columns. The size of advertisements are defined by the number of columns of width and a height. Since people typically begin looking for a commercial establishment at the beginning of a category, the advertisements are placed as close to the beginning as possible. Pagination and layout of the advertisements within these rules and guidelines can be extremely difficult. Typically the process is done by hand by groups of people who determine reasonable layouts. No attempt is made to optimize the layout; in order to meet the requirements, considerable space is wasted on each page. It is estimated that ten to fifteen percent of the total available space in a yellow page directory is wasted. This corresponds to an annual waste of 2,000 to 3,000 tons of paper just for the yellow page directories for the New York and New England areas of the United States.

Document formatting problems arise in the publication of different types of material. Research in the area of automated formatting of documents with computers has focused on formatting text. Pagination and page layout problems have received less attention. Two different approaches have been used in automatically paginating and laying out pages which could be applied to yellow pages. In a rule based approach, described in H. G. Chew, M. Liang, P. Koh, D. Ong, and J. H. Tan, "ALEXIS: An intelligent layout tool for publishing," in Proceedings of the Sixth Annual Conference on Innovative Applications of Artificial Intelligence, (August 1994) pp. 41–47, and J. P. Rosenking, H. J. Marmorstein, E. M. Baron-Vartian, and R. W. Soccio, "A Generic System for Directory Pagination," in Proceedings of the IEEE/ACM International Conference on Developing and Managing Expert System Programs, (April 1991) pp. 166–169 include a set of if-then rules which define specific decisions to be made in meeting the guidelines with certain advertisement and text configurations. The rule based system has been useful in assisting people who actually layout the pages. Its use has resulted in modest savings, on the order of 1–2% of pages. However, the number of possible configurations is quite large and a reasonably sized rule base cannot accommodate all configurations. Thus, it is unlikely that a set of rules can be accurately defined in order to optimize page layout.

A dynamic programming approach, discussed in M. F. Plass, "Optimal Pagination Techniques for Automatic Typesetting Systems," Stamford University (1981), could be applied to determining pagination and layout for yellow pages. However, use of the algorithms described in Plass to determine an automatic system for pagination and layout of yellow pages which is sufficient would be very challenging, and may be impossible.

The prior art systems fail to provide a method for automatically paginating and laying out yellow pages which can result in a significant reduction of wasted space. Therefore, it is an object of the present invention to provide a system which can optimize yellow page layout.

SUMMARY OF THE INVENTION

The present invention uses a heuristic approach called simulated annealing to optimize pagination and page layout. First, a potential pagination is randomly determined for the set of advertisements and the advertisements are randomly assigned to columns on that page. Second, the advertisements are dropped upon the page in the appropriate columns. The text is then placed in the empty spaces above (or below) the advertisements. A set of rules, based upon the guidelines for laying out the yellow pages, are applied to the pagination and layout in order to determine a score for the layout.

The pagination is changed in a random manner by an iterative process. At each iteration, the advertisements and text are laid out on the pages as described previously. Each page is then laid out and the score redetermined. The new pagination is kept for further modification if it has a better score than the previous layout, or is randomly selected according to a certain probability if it does not improve the prior score. The later action is instrumental in avoiding becoming stuck in locally optimal solutions.

Since the starting values are randomly determined, and the optimization uses small, random perturbations, the pagination and layout method may not always lead to the best possible result. Therefore, according to an aspect of the invention, the process is repeated multiple times with different initial paginations and layouts. Once each pagination and layout has been optimized, the one with the best score is selected as the best layout.

DETAILED DESCRIPTION

Figure 1:
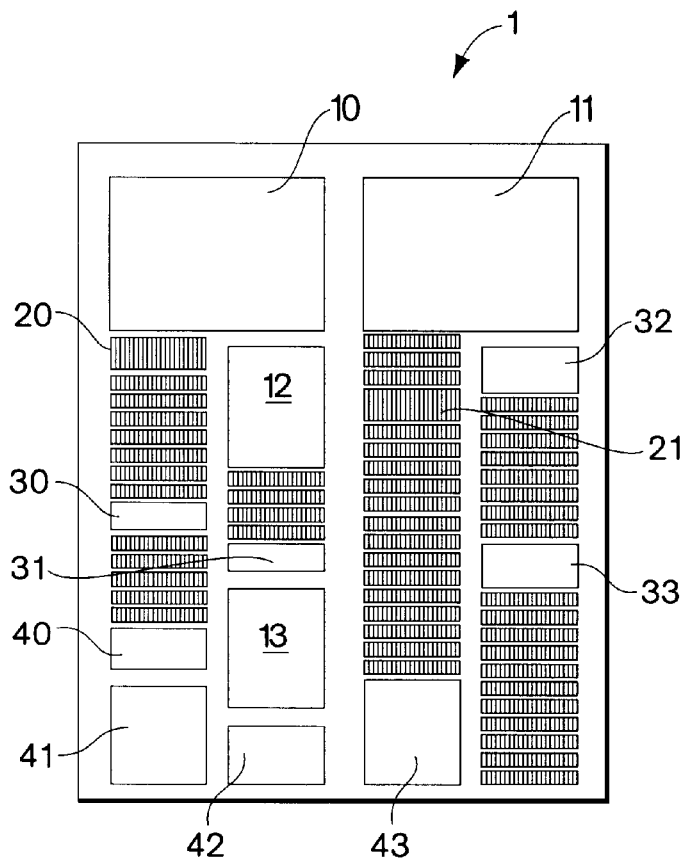
FIG. 1 illustrates a page from a yellow pages directory

FIG. 1 illustrates a page from a yellow pages directory. Two different types of information are included on the page, advertisements and text. The advertisements 10, 11, 12, 13, are placed on the page. Each advertisement covers one or more of the four columns on the page and has a defined height. The order of the advertisements is defined by the rules and pricing structure of the yellow pages directory. The rules and pricing structures vary by country and directory producer. Typically, within a category or section (e.g., "Restaurants") larger advertisements come before smaller advertisements and the same size advertisements are ordered by seniority in placing the advertisements. Text is located around the advertisements. The text includes three parts, an alphabetical listing, section advertisements 20, 21, and in-text advertisements 30, 31, 32, 33. The section headers 20, 21 define the categories into which the text and advertisements are divided within the yellow pages directory. The alphabetical listing includes a name and telephone number for each of the entities within the category defined by the section heading in alphabetical order. In-text advertisements are small advertisements which cover a single column and several lines in the alphabetical listing. These advertisements are placed in the proper order in alphabetical order in the text. A page also includes filler 40, 41, 42, 43. Filler is used to synchronize the advertisements and text so that advertisements appear on pages which include the sections to which the advertisements apply. Often, different types of information are placed in the filler 40, 41, 42, 43 so that it is not simply empty space. Such information includes advertisements for the publisher of the telephone directory, wise sayings, and trivia.

Figure 2:
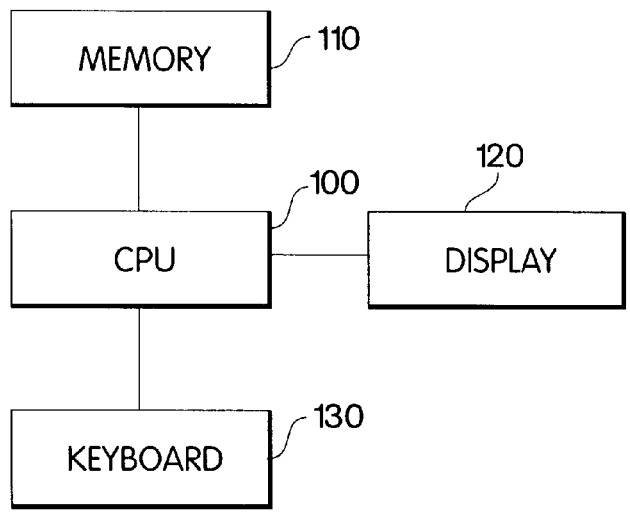
FIG. 2 illustrates computer hardware which is useful in practicing the present invention.

FIG. 2 illustrates a computer system which can be used in conjunction with the method of the present invention to layout the pages of a yellow pages directory in order to reduce the amount of filler. A central processing unit (CPU) 100 executes a set of predefined steps in carrying out the method of the present invention. A memory 110, connected to the CPU 100, stores the advertisements, texts, and page layouts. The memory can include different types of devices, such as RAM, ROM, hard disk drives, floppy disk drives, and other types of storage systems. Furthermore, the memory 110 can be made up of different individual memories, each storing part of the information. The program steps which are executed in the CPU 100 may also be stored in the memory 110. A user interfaces with the system through a keyboard 130 and display 120 which are both connected to the CPU 100. The system may also include a printer or other device for outputting the pages of the yellow pages directory. Alternatively, information about the pages may be outputted so that another system, or person, can perform the actual layout.

Figure 3:
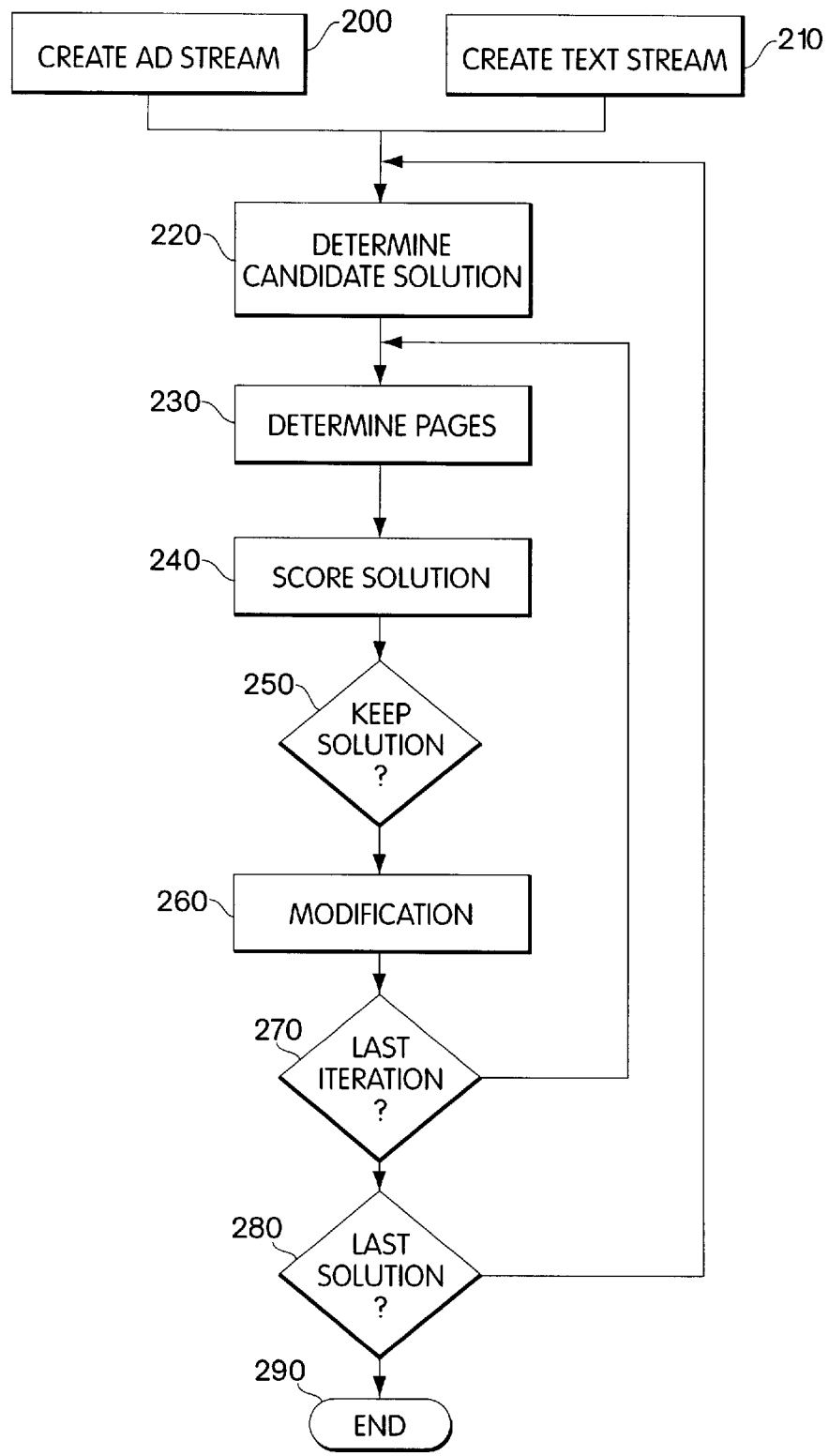
FIG. 3 illustrates the procedure for pagination and page layout according to the present invention.

FIG. 3 is a block flow diagram which illustrates the method of the present invention. At steps 200, 210, the advertisement stream and text stream are created. The advertisement stream defines each of the advertisements in the order in which they will appear in the telephone directory and the size of each advertisement. Advertisements of the same size are ordered according to rules defined by the publisher of the yellow pages directory. The text stream, created at step 210, includes the alphabetical listing, the section headers, and the in-text advertisements.

Once the advertisement stream and text stream are created, a candidate solution for pagination is determined at step 220. The candidate solution is defined by three parameters, the location of page breaks in the advertisement stream, a starting column position for each advertisement, and a padding amount on each page. Padding represents empty space or filler between the text and advertisements. (Sometimes, advertisements are placed so that empty spaces are formed between advertisements. No text is placed in those types of filler, called bubbles.) Values for each of these parameters are randomly determined to create the initial candidate solution. According to one embodiment, the initial number of pages is selected to have an area large enough to include all of the text and advertisements plus 3–5%. The page breaks are then positioned to evenly distribute the advertisements, by area, across the pages. The starting column positions are randomly assigned to the advertisements with a uniform distributor. The padding amount is initially set to zero. Of course, other conditions could be used to set the parameter values for the initial candidate solution.

The actual layout of each page is then determined at step 230 based upon the candidate solution. The candidate solution defines the pages to which each advertisement belongs and a column number for the advertisement. The advertisements are placed on the page in order in the next available space in the relevant column. Available space may be defined from the top or bottom of a page. Assuming placement from the bottom, a first advertisement is placed in the identified column at the bottom of the page. A second advertisement is then placed in its appropriate column. If the second advertisement covers a column also covered by the first advertisement, it is placed above the first advertisement. Otherwise, it is placed next to it. The process is repeated until all of the advertisements have been placed on the page. Once each of the advertisements is placed upon the page, the text stream is placed in the remaining spaces on the page with an amount of padding at the end of each column such that the total areas of text, advertisements, and bubbles do not exceed the page area less the minimum padding requirement for that page. According to an embodiment of the invention, text is only placed in columns above the advertisements which have been placed from the bottom of the page.

Once each of the pages is laid out, a candidate solution is scored (step 240) in order to represent its compliance with the rules and guidelines for the yellow pages directory. Table 1 illustrates a system for scoring a candidate solution, according to the embodiment.

TABLE 1

| Term | Description | Value |
| --- | --- | --- |
| OVERFLOW | A cost that is assessed once if any page has insufficient room for its assigned advertisements | 50,000.0 |
| OVERFLOW_AREA | A cost per unit area of overflowing advertisements. | 200.0 × area |
| OUT_OF_SECTION | A cost for each advertisement that is not in the same section as its associated text entry, i.e., not on the same page as the start or end of the appropriate section header, or on some page in between. | 75,000.0 × # of advertisements |
| DISTANCE_OUT_OF_SECTION | This cost is proportional to the number of pages an advertisement is away from the beginning, or end of its section. | 500.0 × # of pages |
| DISTANCE_FROM_SECTION_START | This cost is assessed for each advertisement that is in its section, | 200.0 × # of pages |

TABLE 1-continued

| Term | Description | Value |
|---|---|---|
| | but that is not on the first page of that section. The cost is proportional to the number of pages the advertisement is away from the start of the section. | |
| BAD_TEXT_BREAK | A penalty for every text column that ends immediately after a section heading. | Infinite |
| ADS_OUT_OF_SIZE_ | A cost for each advertisement that appears before a bigger advertisement within a section. | Infinite |
| BUBBLE | Filler that surrounded by advertisements is called a bubble. This cost is proportional to the total bubble area. | 6.0 × area |
| PAD_PADDING | Filler that is not a bubble is called padding. This cost is proportional to the total amount of padding. | 3.0 × area |
| EVEN_PADDING | This cost is proportional to the amount by which the pad advertising for each column on a page differs from the average amount of padding per column for that page. | 0.3 × area |

The scoring system illustrated in Table 1 defines a cost for layouts, including those that are not within the yellow pages guidelines and for inefficient layouts. The first element, overflow, defines when a page has more advertisements than will fit on the page. A large cost is assigned to such a condition since it is impossible to print the page. The next item, overflow-area, is used to promote improvement in a subsequent layout which still has an overflow. The overflow-area defines an amount of error in the number of advertisements on a page. As this area is reduced, the score improves, which indicates steps toward eliminating the overflow. The out of section cost determines when an advertisement is not on a page that is part of the section to which it belongs. This has a large value since advertisements are not to appear out of their section. In some instances, such as yellow pages published in other countries, the guidelines may allow an advertisement to be slightly out of its section. If so, the scoring structure could be revised to reflect this, and a smaller cost for advertisements out of section could be used. The distance-out-of-section cost provides a method for tracking improved scores when advertisements remain out of section, but are closer to the section. People tend to look at advertisements at the beginning of a section. Therefore, a distance-from-section-start cost is assessed for the distance of each advertisement from the start of its corresponding section. This will result in advertisements being closer to the start of the section. The bad-text-break and advertisements-out-of-size-order have infinite cost in Table 1 because they are not possible in one embodiment of the invention. With an advertisement stream which is ordered according to size, the advertisements can never be out of size order. Also, when placing the text, the system does not allow a break after a section heading. Alternatively, if the page creation system allows variation in advertisement order or page breaks, a cost would need to be identified for these items, in order to meet guidelines for the yellow pages directory. The bubble-cost refers to area surrounded by advertisements which does not include text. The padding and even-padding costs are to reduce and distribute the amount of empty space used in the pages in order to synchronize the text and advertisements. Of course, other criteria could be used depending upon the standards to be applied in creating the page layouts.

The candidate solution is then optimized using a heuristic approach called simulated annealing. For simulated annealing, a modification or perturbation is made in the candidate solution at step 260. A modification or perturbation is a randomly selected change to one of the values defining the candidate solution. For example, a page break in the advertisement stream can be changed by randomly selecting one page break to delete and/or randomly selecting a page break to insert in the advertisement stream. Alternatively, the column number for a randomly selected advertisement can be randomly reset. Finally, the padding allotment for a page can also be randomly reset. According to one embodiment, the padding advertising allotment for a randomly selected page is given the value $y=e^x-1$, where x is randomly selected from a uniform distribution of the range [log (1), log (1+A/4)], with A being the page area. Each of these different types of perturbations is randomly selected according to a predefined probability. Thus, in step 260, a type of perturbation is selected according to the predefined probability, and then the perturbation is randomly made to the candidate solution.

Once a modification has been made, the new candidate solution is decoded to determine the layout for each page (step 230) and scored (step 240). A determination is then made (step 250) whether to keep the new candidate solution or the prior candidate solution. In simulated annealing, the new solution is kept if the score is lower than the score for the prior solution. Also, if the score is greater than the score for the prior solution, the new solution is kept with a defined probability of $e^{(score2-score1)/t}$. t is a factor used to adjust the probability of keeping a solution which is not better than a previous solution. t is adjusted each time that a predefined number of new solutions have been kept. The process of simulated annealing is described in S. Kirkpatrick, C. D. Gelatte, Jr., and M. P. Vecchi, "Optimization by Simulated Annealing," *Science* (May 1983) pp. 671–680, and V. Cerny, "A Thermodynamic Approach to the Traveling Salesman Problem: An Efficient Simulation Algorithm," *Journal of Optimization Theory Applications*, (1985), pp. 41–51, incorporated herein by reference. Other optimization approaches could be used instead of simulated annealing. For example, a hill climbing approach can be used in which the new solution is only kept if it has a better score than the prior solution. However, empirical results have shown that this hill climbing approach is not as effective as the simulated annealing approach. The optimization process is repeated until a last iteration is obtained. The last iteration can be defined by a total number of iterations, or by a number of iterations without improvement.

Since the initial candidate solution was randomly determined and the perturbations are randomly made, other changes may be possible which would result in an improved score. In order to determine a best result, the entire process can be repeated with a new candidate solution. The new candidate solutions can be processed serially on the same system, or a plurality of systems each corresponding to the structure shown in FIG. 2 can be used for processing and optimizing different candidate solutions. Once a predefined number of candidate solutions have been created and optimized according to the above procedure, a best solution is selected at step 290. This best solution represents the best layout determined from the system.

Figure 4:
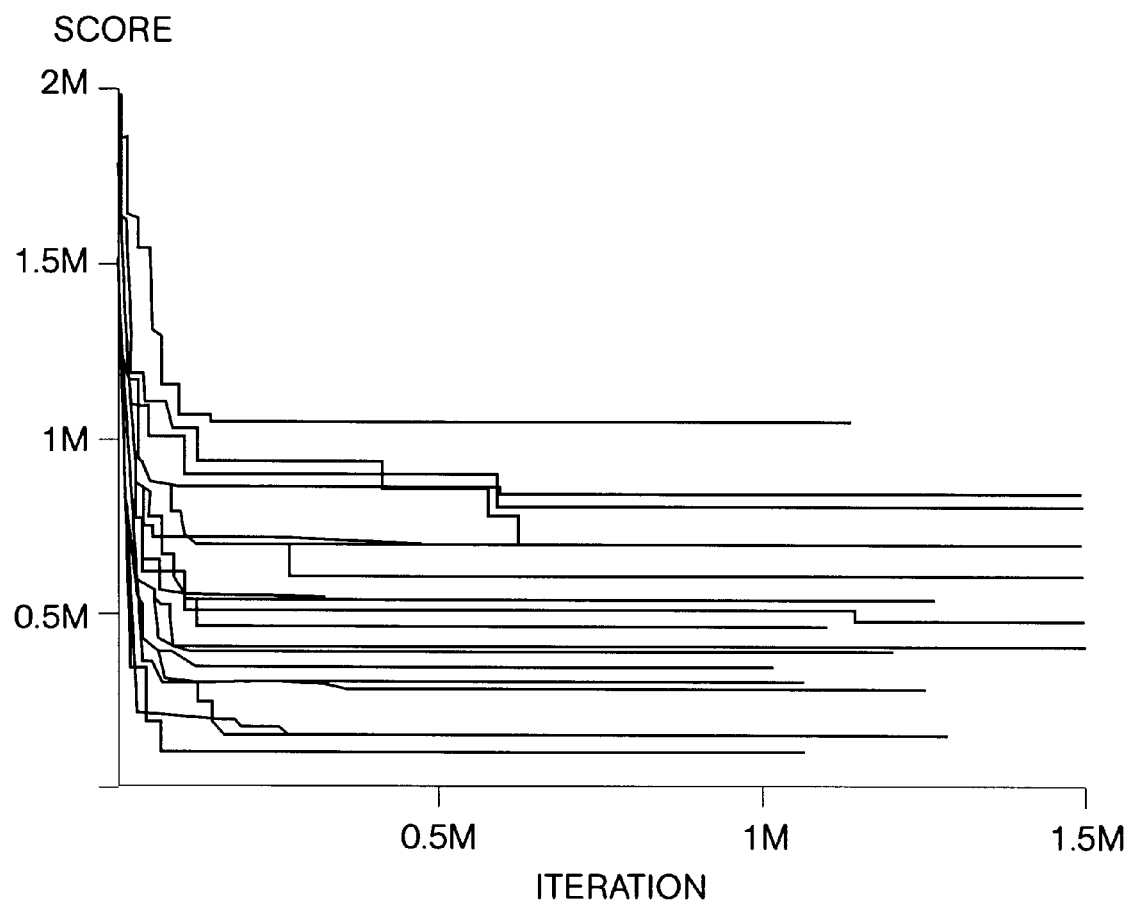
FIG. 4 illustrates the optimization results of the present invention.

FIG. 4 illustrates the scores for a layout of a certain number of pages from a telephone directory. The x axis represent the numbers of iterations in optimizing a solution, in millions. The y axis represents the scores, also in millions. Each of the lines represents an initial candidate solution and its score upon optimization. As can be seen from the graph, several candidate solutions are not significantly optimized, and other solutions become significantly optimized. The use of multiple initial candidate solutions results in an improved performance in layout.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims.

What is claimed is:

1. A method for determining pagination and a layout of pages having a stream of ordered advertisements of specified sizes and a stream of text, the method comprising the steps of:

randomly setting page break locations in the stream of ordered advertisement;

randomly placing the advertisements on each page;

placing text in spaces between advertisements on each page; and randomly adjusting at least one of a page break location and placement of an advertisement on a page.

2. The method of claim 1, wherein said randomly placing step includes the steps of:

randomly assigning a starting column to each advertisement; and placing each advertisement on a page in order in a lowest available position in an assigned column.

3. The method of claim 1, wherein said placing step includes adding a random amount of empty space on each page; and wherein said randomly adjusting step includes randomly changing an amount of empty space on a page.

4. The method of claim 1, further comprising the steps of:

determining a first value for placement of the advertisements and text, prior to said adjusting step;

randomly placing the advertisements on each page, after said adjusting step;

placing text in spaces between advertisements on each page;

determining a second value for adjusted placement of adjusted advertisements and text; and keeping one of the placement and the adjusted placement based upon said first and second value.

5. A method for determining pagination and layout of advertisements and text, comprising the steps of:

randomly forming a first configuration of pages of advertisements and text; and optimizing the first configuration.

6. The method of claim 5, wherein said optimizing step includes the steps of:

determining a first value for the first configuration;

randomly adjusting one of a page break, a position of an advertisement, and an amount of empty space on a page;

determining a second value for the adjusted first configuration;

keeping one of the first configuration and the adjusted configuration based upon said first value and said second value; and repeating said randomly adjusting, determining a second value, and keeping steps.

7. The method of claim 5, further comprising the steps of:

randomly forming at least one second configuration of pages of advertisements text; and optimizing the at least one second configuration;

determining values for said first configuration and said at least one second configuration; and selecting one of said first configuration and said second configuration based upon said values.

8. A system for automatically determining pagination and layout of pages comprising:

a memory for storing a stream of ordered advertisements with corresponding sizes;

a memory for storing a stream of text;

means for randomly identifying page break locations in the stream of ordered advertisements;

means for placing each advertisement at a location on a corresponding page;

means for placing text from the stream of text in spaces between advertisements on each page; and means for randomly adjusting at least one of a page break location and a placement of an advertisement on a page.

9. The system of claim 8, further comprising means for forming said stream of ordered advertisements according, including:

means for separating a plurality of advertisements into corresponding categories; and means for ordering each advertisements corresponding to each category based upon a size corresponding to each advertisement.

10. The system of claim 8, wherein said means for randomly placing advertisements on a page includes:

means for randomly assigning a starting column to each advertisement; and means for determining a next available space for each advertisement based upon said starting column and a corresponding size.

11. The apparatus of claim 8, further comprising means for placing a random amount of empty space between the advertisements, and wherein said means for randomly adjusting includes means for randomly changing an amount of empty space on a page.

12. The apparatus of claim 8, further comprising:

means for determining values for placement of the advertisements and text, before and after adjustment by said means for randomly adjusting;

means for selecting one of placement before adjustment and placement after adjustment based upon said values.

* * * * *